United States Patent [19]
Hollinger

[11] Patent Number: 5,715,331
[45] Date of Patent: Feb. 3, 1998

[54] SYSTEM FOR GENERATION OF A COMPOSITE RASTER-VECTOR IMAGE

[76] Inventor: Steven J. Hollinger, 50 Melcher St., Boston, Mass. 02210

[21] Appl. No.: 262,948

[22] Filed: Jun. 21, 1994

[51] Int. Cl.[6] ............................................. G06K 9/48
[52] U.S. Cl. ................................... 382/199; 382/264
[58] Field of Search ........................ 395/133, 135, 395/150, 151; 345/133, 135, 189, 202; 382/309, 311, 242, 205, 199, 264

[56] References Cited

U.S. PATENT DOCUMENTS

| | | | |
|---|---|---|---|
| 4,777,651 | 10/1988 | McCann et al. | 382/21 |
| 5,101,436 | 3/1992 | DeAguiar et al. | 382/1 |

*Primary Examiner*—Joseph Mancuso
*Attorney, Agent, or Firm*—Wolf, Greenfield & Sacks, P.C.

[57] ABSTRACT

A system for creating raster-vector composite images from raster images. Edges detected in the raster image are used to create a vector image. The vector image is combined with the raster image to create a composite image. Edges in the raster image can be deleted since the detail information is contained in the vector image. The composite image can be manipulated without distortion. To print or display the image, the vector image data is rasterized and merged with the raster image data.

15 Claims, 2 Drawing Sheets

SYSTEM FOR GENERATION OF A COMPOSITE RASTER-VECTOR IMAGE

FIELD OF THE INVENTION

The present invention relates to image processing systems for creating and displaying composite raster-vector images. More particularly, it relates to the automatic production of a composite image from a raster image for image enhancement.

BACKGROUND OF THE INVENTION

Computer images are typically stored in raster form. A raster image consists of a two-dimensional set of pixels. Each pixel describes a shade, color or visual appearance of the image at the point corresponding to the pixel. In order to display or print the image, the described shade, color or appearance is presented at each pixel location. However, raster images have difficulties with modifying the image, such as scaling or rotating. When such modifications are made to the raster image, boundaries in the image, such as detail or edges between colors, can become distorted in the displayed image.

Another method for storing computer image data is in a vector form. In the vector form, the image is described as a set of lines, curves and polygons. Each line consists of a direction from a point, a line width and color. The vector image can be easily manipulated because scaling requires a change in line width and length, and rotation requires a change in line direction. However, vector images require substantially more storage space than raster images for images with large color areas or areas containing significant variations in color. Of course, systems can convert images from one form to another, i.e., raster to vector and vector to raster.

In order to take advantage of the benefits of each type of image form, some systems have been created to provide a raster-vector composite image. In a composite image, portions of the picture are represented in raster form and other portions of the picture are represented in vector form. In order to display or print the picture on a raster output device, the system must overlay the raster image with the vector image. The vector image is first rasterized and then merged with raster image. An example of such a system would be a computer monitor that displays a raster image with a scalable type overlay. The scalable type overlay is internally represented in vector form, which allows it to be easily manipulated. Each of the two images is controlled separately and then rasterized and combined to produce a single displayed or printed output composite image. However, each type of image must be created and manipulated independently in order to produce a composite image.

Another process which uses composite images relates to color trapping for multicolor printing. In multicolor printing, colors can overlap between objects to prevent white gaps from appearing between colors if the printing plates are misaligned. The extension of the colors is called a trap. A system exists to automatically determine traps. The edges of a raster image are detected to determine boundaries. A vector image of the boundary is created in a color which merges the two adjacent colors. The image, including both the raster and vector parts, is used to create the different color plates. The data in the vector image provides the traps for overlapping colors. In such a system, only those object boundaries which violate specific rules with regard to registration of printing plates are affected. Other image details and objects are completely ignored. Furthermore, trap lines are created using a color that is common to both adjacent areas and are of a particularly fine weight to minimize visibility of the trap line while correcting for the potential misregistration problem.

Therefore, a need exists for a system which can combine the benefits of raster and vector image forms for enhancing detail. A need exists for a system to easily store an image in raster form and still be able to manipulate the image without distortion.

SUMMARY OF THE INVENTION

The deficiencies of the existing systems are overcome by the present invention which includes a system for creating a partial vector image from a raster image and then creating a composite raster-vector image.

According to the present invention, edges in a raster image are detected and used to generate a vector image only of the edges. The original raster image and the newly created vector image are then composited to create a composite image. In order to display or print the image, the vector image is rasterized and merged with the raster image. When manipulating the images, the overlay of the vector image of the edges masks any distortion of the boundaries resulting from manipulation of the raster image. In another aspect of the invention, the data in the raster image can be smoothed by eliminating information which is contained in the vector image.

Therefore, it is an object of the present invention to provide a system for creating composite raster-vector images from raster only images. It is another object of the present invention to provide a composite image which can be easily manipulated, rotated and scaled. It is another object of the present invention to create a system which eliminates duplicative data from a composite image.

With these and other objects, advantages and features of the invention that may become apparent, the nature of the invention may be more clearly understood by reference to the following detailed description of the invention, the appended claims and the several drawings attached hereto.

DETAILED DESCRIPTION OF PREFERRED EMBODIMENTS

Figure 1:
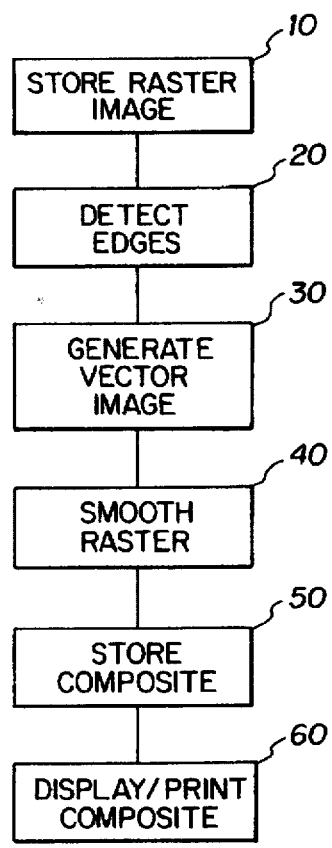
FIG. 1 is a block flow diagram of operation of the system according to the preferred embodiment of the present invention.
Figure 3:
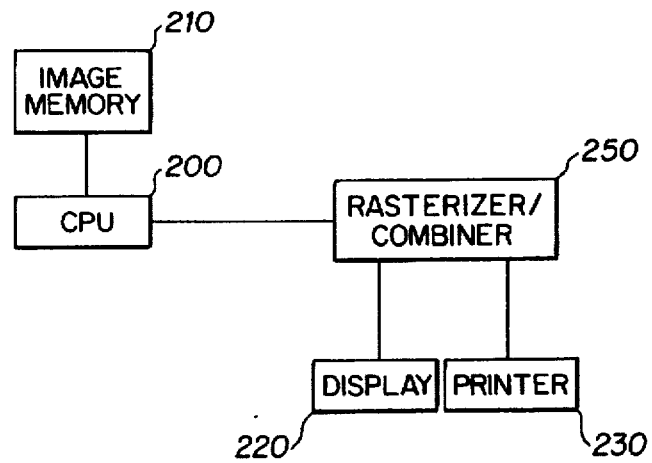
FIG. 3 is a block representation of the hardware of the system implementing the present invention.

A preferred embodiment of the present invention will be described with respect to the drawings. First shown in FIG. 1 is a block flow diagram of the operation of an image processing system according to the present invention. FIG. 3 is a block diagram illustrating hardware for implementing the present invention. In FIG. 3, operation of the system is controlled by the central processing unit (CPU) 200, which is connected to an image memory 210. The image memory 210 can be of any type, such as RAM, diskettes, hard disk and CD-ROM which has capacity to store the image data and can be accessed by the CPU 200. The CPU 200 is also attached to a display 220 and printer 230 for outputting image data.

Figure 4:
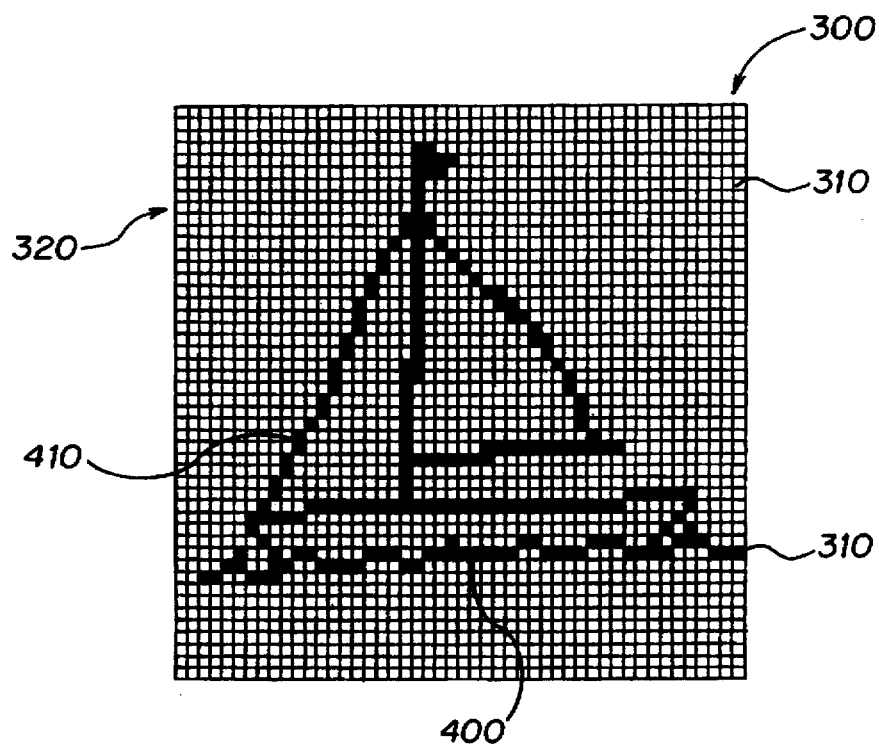
FIG. 4 is an illustration of a raster image.
Figure 5:
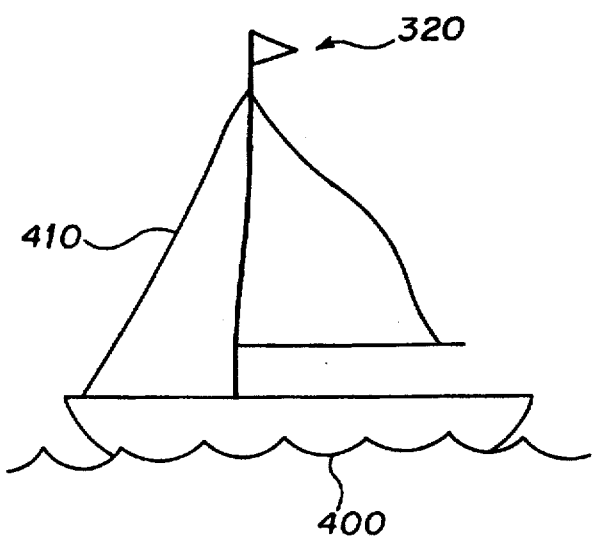
FIG. 5 is an illustration of a vector image corresponding to the raster image of FIG. 4.

At step 10, shown in FIG. 1, raster image data is stored in the image memory 210. FIG. 4 is an illustration of a raster image. The raster image 300 is a two-dimensional array of pixels 310. Each pixel 310 represents a color, shading or other representation of the picture. FIG. 4 illustrates an image of a sailboat 320. In the raster image 300, each pixel 310 would be a color or shading representative of the corresponding representation of the image of the sailboat 320.

At step 20 in FIG. 1, the system according to the present invention detects edges in the raster image. Edge detection can be performed in any conventional manner which determines high frequency changes between adjacent pixels in the raster image. The edges are represented in FIG. 4. At step 30, the vector image is generated from the detected edges. The vector image consists of end points, control points, line weights and colors representing the edges detected.

There are two types of edges which will be detected and represented in the vector image. First, edges can be boundaries between two colors 400, such as between the water and the sailboat. Second, an edge can be a detail 410, which is a different colored line between identical colors. The guideline 410 between the mast and the front of the boat is a detail. For boundary edges 400, the vector image consists of a line overlaying one edge of the boundary of a color corresponding to part of the image being overlaid. For detail edges 410, the vector image consists of a line in a detail color overlaying the detail position.

At step 40 in FIG. 1, the raster image can be smoothed to remove repetitive information. For example, detail edges 410 which are now contained in the vector image can be removed from the raster image. The removal of detail from the raster image improves its compression ratio which permits less storage.

Figure 2:
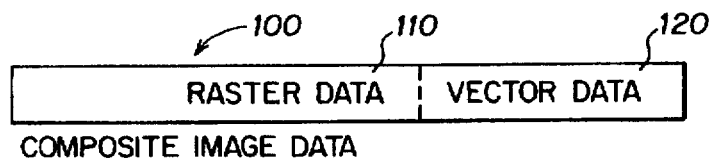
FIG. 2 is representation of image data storage according to a preferred embodiment of the present invention.

In step 50, the composite image is stored in the image memory 210. As illustrated in FIG. 2, the composition image consists of two sets of image data, raster data 110 and vector data 120. The two types of data can be stored sequentially in a single location, as illustrated in FIG. 2, or can be stored in separate locations as long as they are associated with the same image and coordinate system.

At step 60, the composite image is displayed or printed on the display 220 or printer 230. To display or print the image, the raster image must be combined with the vector image. One method for combining the images is first to convert the vector image to raster data. The display image is then created by replacing pixels of raster data with pixels contained in the vector data, or otherwise combining the rasterized vector image data with the raster image data. As shown in FIG. 3, a rasterizer/combiner 250 can be connected to the CPU for combining the separate images. The rasterizer/combiner 250 could be part of the display 220 or printer 230, or a separate unit. Alternatively, the images could be combined by the CPU. The display image data is then outputted to the display 220 or printer 230.

In another embodiment, the line weights and colors of the vector image can be modified in order to enhance detail in the composite image. Therefore, a line can be widened or the color altered slightly to enhance perception of the boundaries detected in step 20.

Although preferred embodiments are specifically illustrated and described herein, it would be appreciated that modifications and variations of the present invention are covered by the above teachings and within the purview of the appended claims without departing from the spirit and intended scope of the invention.

I claim:

1. A composite image system, comprising:
   an image memory for storing image data, including raster image data of an image;
   detection means for automatically detecting edges in the image as a set of all adjacent elements in said raster image data having value differences which exceed a predetermined threshold;
   vector means for generating vector image data for the edges in the image by representing relationships between elements in said set of adjacent elements, and for storing said vector image data in said image memory; and
   image smoothing means for replacing values in said raster image data corresponding to selected ones of said set of adjacent elements to eliminate raster image data which is duplicative of the vector image data.

2. The composite image system according to claim 1, further comprising display means for simultaneously displaying said raster image data and said vector image data.

3. The composite image system according to claim 2, wherein said display means includes:
   conversion means for converting said vector image data to pixel data;
   combining means for merging pixel data in said raster image data with pixel data from said conversion means to create a display image;
   displaying means for displaying said display image.

4. A composite image system according to claim 1, further comprising printer means for simultaneously printing said raster image data and said vector image data.

5. The composite image system according to claim 4, wherein said printer means includes:
   conversion means for converting said vector image data to pixel data;
   combining means for replacing pixel data in said raster image data with pixel data from said conversion means to create a display image; printing means for printing said display image.

6. The composite image system according to claim 1, wherein said image smoothing means replaces said selected ones of said set of adjacent elements with values of corresponding ones of said adjacent elements.

7. The composite image system according to claim 6, wherein said image smoothing means includes:
   detail edge determining means for determining whether each of said adjacent elements is part of a detail edge; and
   selection means for selecting values of said adjacent elements which are part of detail edges for replacement.

8. The composite image system according to claim 1, further comprising image manipulation means, said image manipulation means including:
   instruction means for receiving an image manipulation instruction;
   raster adjust means for changing said raster image data to correspond to manipulation of said image defined by said image manipulation instruction, while maintaining a raster form of said raster image data;
   vector adjust means for changing said vector image data to correspond to manipulation of said image defined by said image manipulation instruction, while maintaining a vector form of said vector image data.

9. The composite image system according to claim 8, further comprising display means for simultaneously displaying said manipulated raster image data and said manipulated vector image data.

10. The composite image system according to claim 1, wherein said vector means stores said vector image data at addresses in said image memory directly following the last address of said raster image data.

11. A method for creating composite images, comprising the steps of:

storing raster image data of an image;

automatically detecting edges in the image as a set of all adjacent elements in said raster image data having value differences which exceed a predetermined threshold;

generating vector image data of edges in the image by representing relationships between said set of adjacent elements;

storing said vector image data; and replacing values of selected ones of said set of adjacent elements in said raster image data to eliminate raster image data which is duplicative of vector image data.

12. The method for creating composite images according to claim 11, further comprising the step of simultaneously displaying said raster image data and said vector image data.

13. The method for creating composite images according to claim 12, wherein said displaying step includes the steps of:

converting said vector image data to pixel data;

replacing pixel data in said raster image data with said converted pixel data to create a display image; and displaying said display image.

14. The method for creating composite images according to claim 11, wherein the step of replacing values includes replacing values of selected ones of said set of adjacent elements in said raster image data with values of corresponding ones of said set of adjacent elements.

15. The method for creating composite images according to claim 14, wherein said replacing step includes the steps of:

determining whether each of said set of adjacent elements is part of a detail edge; and selecting values of adjacent elements which are part detail edges for replacement.

* * * * *